United States Patent

[11] 3,599,329

| | | |
|---|---|---|
| [72] | Inventor | Donovan Batt<br>Elm Glen, Lissarda, County Cork, Ireland |
| [21] | Appl. No. | 766,467 |
| [22] | Filed | Oct. 10, 1968 |
| [45] | Patented | Aug. 17, 1971 |
| [32] | Priority | Oct. 13, 1967 |
| [33] | | Ireland |
| [31] | | 830/67 |

[54] APPARATUS FOR DEHORNING ANIMALS SUCH AS CATTLE
6 Claims, 3 Drawing Figs.

[52] U.S. Cl. ............................................. 30/228
[51] Int. Cl. ........................................ B26b 15/00
[50] Field of Search ........................................ 30/180, 228, 241, 277

[56] References Cited
UNITED STATES PATENTS

| 3,474,533 | 10/1969 | Peck | 30/228 |
| 2,764,813 | 10/1956 | Hoffman | 30/228 |
| 2,766,525 | 10/1956 | Hoffman | 30/228 |

Primary Examiner—Robert C. Riordon
Assistant Examiner—J. C. Peters
Attorney—Kurt Kelman

ABSTRACT: Animal dehorning apparatus including horn embracing means for receiving an animal horn, a percussion mechanism actuable to propel a cutting blade towards the horn embracing means, movement of the cutting blade being guided by a pair of parallel and spaced apart bars connecting the horn embracing means to a support for the percussion mechanism.

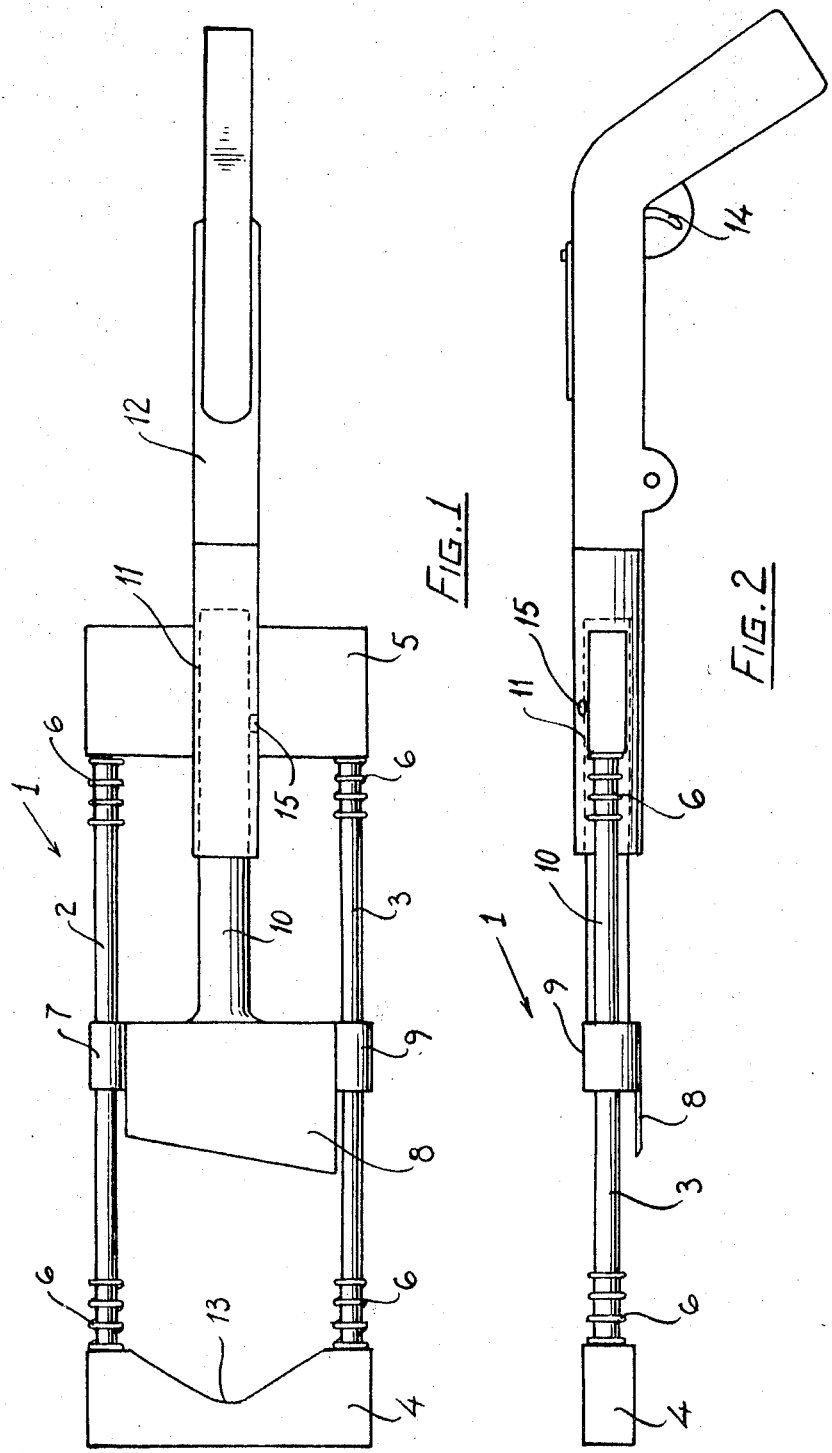

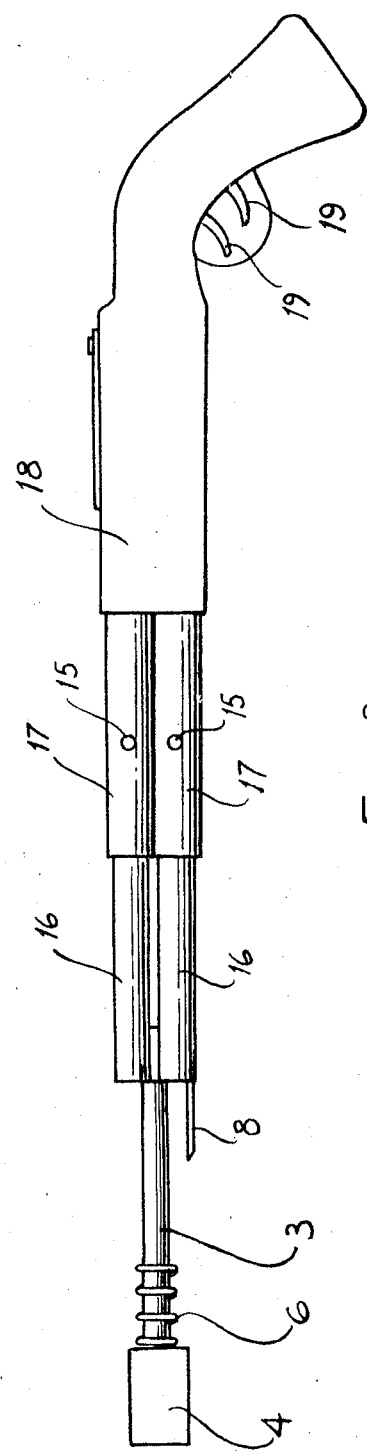

APPARATUS FOR DEHORNING ANIMALS SUCH AS CATTLE

This invention relates to apparatus for dehorning animals, such as cattle.

It is well known that horned animals, hereinafter referred to collectively as cattle, when disturbed and/or frightened tend to cause damage with their horns not only to their surroundings but often to themselves. Dehorning is therefore considered highly desirable by cattle breeders in order to minimize the occurrence of such damage and further since it has been found that dehorning promotes a quicker and healthier growth of young stock.

At present the method of dehorning cattle generally used is to saw off the horns. In spite of the utilization of local anesthetics, the dehorning operation often causes considerable disquiet and discomfort to the cattle accompanied by bleeding and in some instances death. Further, the method at present used is both a laborious and time consuming task.

The present invention is directed towards overcoming the present difficulties associated with the dehorning of cattle by providing an apparatus comprising a framework adapted for embracing the horn, a cutting blade slidably mounted for controlled movement within the framework and cutting blade propulsion means operatively connected to the cutting blade.

Preferably the cutting blade is mounted upon a shaft housed within the barrel of a gun mechanism or the cylinder of a precussion mechanism actuated by pneumatic means, while the framework comprises a pair of spaced apart bars bridged at their ends by supporting members, one of which is adapted for clamping against the horn to be cut, while the other member centrally supports the cutting blade propulsion means, the cutting blade being slidably mounted on the bars of the framework.

The invention will be more clearly understood from the following description of a preferred embodiment, given by way of example only, with reference to the accompanying drawings in which:

FIG. 1 is a plan view of the apparatus according to the invention

FIG. 2 is a side view, and

FIG. 3 is a side view of a modification of the apparatus illustrated in Figs. 1 and 2.

Referring to Fig. 1 and 2, the apparatus comprises a framework, indicated generally at 1, comprising two longitudinal steel bars 2 and 3 bridged at their ends by a support member 4 and a barrel supporting member 5. Each end of the bars 2 and 3 are provided with springs 6 which serve as damping means as hereinafter described. A steel cutting blade 8 is slidably mounted on the bars 2 and 3 by means of tubular guide members 7 and 9 respectively. The cutting blade 8 is connected to a steel shaft 10 housed within the barrel 11 of a gun mechanism 12, the barrel 11 being centrally mounted in the barrel supporting member 5. The gun mechanism 12 is actuated in conventional manner using a trigger device 14 and conventional ballistic cartridges. An exhaust port 15 is provided in the barrel 11.

In order to facilitate proper location and gripping of the horn immediately prior to dehorning, the supporting member 4 is suitably shaped at 13 to embrace the horn.

In operation a ballistic cartridge is loaded into the gun mechanism 12 and the bar 10 pushed down into the barrel 11 to retract the cutting blade 8 away from the supporting member 4. The framework 1 of the apparatus is placed over the horn to be cut, the horn being located and maintained in position in the shaped portion 13 of the supporting member 4. The trigger 14 is pulled to actuate the gun mechanism which results in the shaft 10 being rapidly expelled from the barrel 11 driving the cutting blade 8 against the horn severing it instantaneously. The springs 6 serve to dampen the vibrations set up in the cutting blade 8 following its forward propulsion and severing of the animal horn.

Referring to Fig. 3, of the drawings, the apparatus is provided with a cutting blade operatively connected to two parallel shafts 16 housed within twin barrels 17 of a gun mechanism 18. The barrels 17 are positioned one above the other and the gun mechanism 18 is provided with a separate trigger device 19 for each barrel 17. The trigger devices 19 are preferably designed so that when required they may be interlocked, in this manner both barrels 17 may be discharged at the same time. It will be appreciated that utilizing an apparatus having twin barrels allows both horns to be cut without reloading of the gun mechanism, one cartridge being fired to actuate the cutting blade to cut a horn. When a large size horn or particularly hard horn is to be cut, the trigger devices 19 are interlocked and the gun mechanism actuated to simultaneously discharge both barrels and impart a particularly forceful forward movement to the cutting blade to cut the horn.

It is envisaged that cutting blade propulsion means other than the gun mechanism and ballistic cartridge may be employed, for example a precussion means actuated by pneumatic means. Accordingly, in the dehorning apparatus the cutting blade may be mounted upon a shaft housed with a pneumatic cylinder to form or be connected to the piston of the pneumatic cylinder, the piston being actuated under the influence of compressed air or gas.

It will be readily appreciated that the apparatus according to the invention will dehorn cattle in a few minutes without any discomfort to the cattle. Further it has been found that use of the apparatus results in only negligible bleeding and permits one to dispense with the use of local anesthetics.

I claim:

1. An animal dehorning device comprising, in combination, an appendage-embracing means, blade guide means for guiding a cutting blade to said appendage-embracing means, a cutting blade means including a leading cutting edge, said cutting blade means being movable on said blade guide means to said appendage-embracing means, propulsion means for propelling said cutting blade means on said blade guide means to said appendage-embracing means, said blade guide means comprising parallel shafts bridged at distal ends thereof by said appendage-embracing means and bridged at proximal ends thereof by a supporting member for supporting said propulsion means, and said cutting blade means including at least two rider members, one of said rider members mounted on one of said shafts and the other of said rider members mounted on the other of said shafts, each rider member substantially circumscribing the shaft on which it is mounted for movement axially along the shaft on which it is mounted, and a resilient spring means mounted on said blade guide means, one end of said spring means resting against a fixed abutment and another end of said spring means being positioned to receive said cutting blade means, said spring means cushioning advancing movement of said blade means when said propulsion means propels said cutting blade means on said blade guide means, said spring means comprising at least two separate coil springs, one of said coil springs being mounted adjacent said appendage-embracing bridging member around one of said parallel shafts, and another of said coil springs being mounted adjacent said appendage-embracing bridging member around the remaining one of said parallel shafts.

2. A device as defined in claim 1, in which said propulsion means comprises a gun means including a barrel means attached thereto, and a rod means having one end thereof mounted in said barrel means for movement within said barrel means and an opposite end of said rod means mounted on said cutting blade means.

3. A device as defined in claim 2, in which said gun means includes two separate gun chambers and triggering mechanisms, and a separate barrel per gun chamber, each barrel having axially movably mounted therein a proximal end of said rod means, and each barrel and said rod means advancing said leading cutting edge from a proximal end of said shafts to said appendage-embracing means.

4. A device as defined in claim 3, in which said separate gun chambers and triggering mechanisms are simultaneously dischargeable.

5. A device as defined in claim 2, in which said parallel shaft means comprise substantially parallel shafts, in which said appendage-embracing means is angular along a length thereof bridging said parallel shafts, said angular appendage-embracing means forming a concave configuration facing said leading cutting edge, said shafts each including said coil springs with one coil spring mounted at each end thereof, and the respective ride member mounted for travel between the springs mounted at opposite ends of each shaft.

6. A device as defined in claim 5, in which said rod means is a rod slidably mounted within a barrel of said barrel means, the longitudinal axis along said barrel and the longitudinal axis of said rod extending in the direction of movement of said blade means between said parallel shafts in a direction toward said concave configuration.